US012761736B2

(12) United States Patent
Shin et al.

(10) Patent No.: US 12,761,736 B2
(45) **Date of Patent: *Oct. 13, 2026**

(54) GESTURE DETECTION VIA IMAGE CAPTURE OF SUBDERMAL TISSUE FROM A WRIST-POINTING CAMERA SYSTEM

(71) Applicant: GOOGLE LLC, Mountain View, CA (US)

(72) Inventors: Dongeek Shin, San Jose, CA (US); Andrea Colaco, Los Altos, CA (US); Stiven Guillaume Francois Morvan, New York, NY (US); Adam James Banfield, Troy, NY (US); Shahram Izadi, Tiburon, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,605

(22) Filed: Feb. 13, 2024

(65) Prior Publication Data

US 2024/0338084 A1 Oct. 10, 2024

Related U.S. Application Data

(63) Continuation of application No. 17/809,772, filed on Jun. 29, 2022, now Pat. No. 11,934,586.

(51) Int. Cl.

*G06F 3/01* (2006.01)
*G06F 1/16* (2006.01)

(Continued)

(52) U.S. Cl.

CPC .............. *G06F 3/017* (2013.01); *G06F 1/163* (2013.01); *G06V 10/82* (2022.01); *G06V 20/20* (2022.01);

(Continued)

(58) Field of Classification Search

CPC ......... G06F 3/017; G06F 1/163; G06V 20/20; G06V 40/1318; G06V 40/28; G06V 40/15; G06V 10/82

See application file for complete search history.

(56) References Cited

U.S. PATENT DOCUMENTS

| | | | | |
|---|---|---|---|---|
| 10,105,608 | B1 | 10/2018 | George et al. | |
| 2014/0152537 | A1 * | 6/2014 | Abdelsamie ............ | G06F 3/017 345/156 |

(Continued)

FOREIGN PATENT DOCUMENTS

| | | | |
|---|---|---|---|
| CN | 112783326 | A | 5/2021 |
| CN | 112822992 | A | 5/2021 |

(Continued)

OTHER PUBLICATIONS

Yuhui Zhu et al., Wrist-worn Hand Gesture Recognition Based on Barometric Pressure Sensing, Mar. 1, 2018, International Conference on Wearable and Implantable Body Sensor Networks, pp. 181-184 (Year: 2019).*

(Continued)

*Primary Examiner* — Tam T Tran

(74) *Attorney, Agent, or Firm* — BRAKE HUGHES BELLERMANN LLP

(57) ABSTRACT

Techniques of operating an AR system include determining hand gestures formed by a user based on a sequence of two-dimensional images through skin of the user's wrist acquired from a near-infrared camera. Specifically, an image capture device disposed on a band worn around a user's wrist includes a source of electromagnetic radiation, e.g., light-emitting diodes in the infrared (IR) wavelength band that emit the radiation into the user's wrist and an IR detector which produces the sequence of two-dimensional images of a region within a dermal layer in the user's wrist. From this sequence, gesture detection circuitry determines (Continued)

values of a biological flow metric, e.g., a change in perfusion index (PI) between frames of the sequence, based on a trained model that generates the metric from the sequence. Finally, the gesture detection circuitry maps the values of the biological flow metric to specific hand/finger movements that determine a gesture.

23 Claims, 13 Drawing Sheets

(51) Int. Cl.
*G06V 10/82* (2022.01)
*G06V 20/20* (2022.01)
*G06V 40/10* (2022.01)
*G06V 40/13* (2022.01)
*G06V 40/20* (2022.01)

(52) U.S. Cl.
CPC .......... *G06V 40/1318* (2022.01); *G06V 40/15* (2022.01); *G06V 40/28* (2022.01)

(56) References Cited

U.S. PATENT DOCUMENTS

| | | | | |
|---|---|---|---|---|
| 2017/0000392 | A1* | 1/2017 | Smith | A61B 5/0077 |
| 2017/0147077 | A1 | 5/2017 | Park et al. | |
| 2018/0307314 | A1 | 10/2018 | Connor | |
| 2018/0307319 | A1* | 10/2018 | Karmon | G06V 40/113 |
| 2019/0101991 | A1* | 4/2019 | Brennan | G06V 40/28 |
| 2019/0286233 | A1 | 9/2019 | Newberry | |
| 2020/0111260 | A1 | 4/2020 | Osborn et al. | |
| 2020/0310098 | A1 | 10/2020 | Ince et al. | |
| 2020/0310539 | A1 | 10/2020 | Barachant et al. | |
| 2020/0311933 | A1* | 10/2020 | Semturs | G06N 3/04 |
| 2020/0375513 | A1 | 12/2020 | Kasbekar et al. | |
| 2021/0124417 | A1 | 4/2021 | Ma | |
| 2021/0142214 | A1* | 5/2021 | Maalouf | G06F 3/017 |
| 2021/0217246 | A1 | 7/2021 | Osborn et al. | |
| 2022/0233096 | A1* | 7/2022 | Smit | A61B 5/113 |

FOREIGN PATENT DOCUMENTS

| | | | |
|---|---|---|---|
| CN | 113646734 | A | 11/2021 |
| JP | 2017094055 | A | 6/2017 |
| KR | 20170059190 | A | 5/2017 |

OTHER PUBLICATIONS

Shuo Jiang et al., Stretchable e-Skin Patch for Gesture Recognition on the Back of the Hand, May 8, 2019, IEEE Transactions on Industrial Electronics, vol. 67, No. 1, pp. 647-657 (Year: 2019).*

International Search Report and Written Opinion for PCT Application No. PCT/US2023/067681, mailed on Sep. 5, 2023, 16 pages.

Hamlet, et al., "A Gesture Recognition System for Mobile Robots That Learns Online", 2014 IEEE/RSJ International Conference on Intelligent Robots and Systems (IROS 2014), Sep. 14-18, 2014, pp. 2114-2119.

McIntosh, et al., "SENSIR: Detecting Hand Gestures With a Wearable Bracelet Using Infrared Transmission and Reflection", UIST 2017, Quebec City, Canada; Session: Phones & Watches, 2017, pp. 593-597.

Yin, et al., "Real-Time Continuous Gesture Recognition for Natural Human-Computer Interaction", 2014 IEEE Symposium on Visual Languages and Human-Centric Computing (VL/HCC), 2014, pp. 113-120.

* cited by examiner

GESTURE DETECTION VIA IMAGE CAPTURE OF SUBDERMAL TISSUE FROM A WRIST-POINTING CAMERA SYSTEM

CROSS REFERENCE TO RELATED APPLICATION

This application is a continuation of U.S. application Ser. No. 17/809,772, filed Jun. 29, 2022, the disclosure of which is incorporated herein by reference in its entirety.

TECHNICAL FIELD

This description relates to determining gestures for controlling objects in augmented reality (AR) systems.

BACKGROUND

Augmented reality (AR) is an interactive experience of a real-world environment where the objects that reside in the real world are enhanced by computer-generated perceptual information, sometimes across multiple sensory modalities, including visual, auditory, and/or haptic. Some AR systems provide such an interactive experience using smartglasses that can provide visual information via a camera mounted on a frame and waveguides and lenses in the frame, and audio and tactile information via the frame.

SUMMARY

Implementations described herein are related to identifying gesture-based input for augmented reality (AR) systems. For example, users of AR systems may wish to pinch a virtual object, e.g., a pencil, to move it around in a display field. Accordingly, a gesture detection system may need to identify a pinching motion. Some AR systems may differentiate between fine distinctions in gesture motions. An example of this would be a differentiation between index finger-thumb pinching and middle finger-thumb pinching. Taking this a step further, different locations on a finger can indicate different object selection on a display. Such gesture differentiation may be difficult for conventional approaches. Improved techniques, however, are based on the observation that changes in perfusion index (PI) optically measured at the wrist can provide information regarding hand and finger movements. Moreover, full two-dimensional imaging of the PI can pinpoint such changes with sufficient accuracy to perform fine differentiation between gestures.

In one general aspect, a method can include capturing a sequence of images through skin of a user's wrist. The method can also include determining a biological fluid flow metric based on the sequence of images. The method can further include determining a gesture formed by the user based on the biological fluid flow metric. The method can further include triggering execution of a command related to an object being displayed in an augmented reality (AR) system based on the gesture.

In another general aspect, an augmented reality (AR) system includes an image capture device configured to capture a sequence of images through skin of a user's wrist. The AR system also includes gesture detection circuitry coupled to a memory. The gesture detection circuitry is configured to determine a biological fluid flow metric based on the sequence of images. The gesture detection circuitry is also configured to determine a gesture formed by the user based on the biological fluid flow metric. The gesture detection circuitry is further configured to trigger execution of a command related to an object being displayed in an augmented reality (AR) system based on the gesture.

In another general aspect, a computer program product comprises a non-transitory storage medium, the computer program product including code that, when executed by processing circuitry, causes the processing circuitry to perform a method. The method can include capturing a sequence of images through skin of a user's wrist. The method can also include determining a biological fluid flow metric based on the sequence of images. The method can further include determining a gesture formed by the user based on the biological fluid flow metric. The method can further include triggering execution of a command related to an object being displayed in an augmented reality (AR) system based on the gesture.

The details of one or more implementations are set forth in the accompanying drawings and the description below. Other features will be apparent from the description and drawings, and from the claims.

DETAILED DESCRIPTION

A challenge for AR systems is providing a robust interface between the smartglasses 100 and the user. Some interfaces utilize user gestures to effect various commands. A robust interface may be able to distinguish between a thumb-index pinch and a thumb-middle finger pinch.

A conventional approach to providing a robust AR interface includes using a world-facing RGB camera mounted on a smartglasses frame to provide images from which a skeletal hand track for full hand/finger interaction and gesture deduction. Nevertheless, there can be issues related to the use of a world-facing RGB camera. For example, such a world-facing RGB camera mounted on a frame of the smartglasses, usually near a hinge, has a camera sensor and an image stack processor (ISP) that consume a relatively large amount of power. Due to this large power consumption, a technical problem with using RBG images from the world-facing RGB camera to deduce user gestures is that the world-facing RGB camera can only be used sparingly.

A technical solution to the above-described technical problem includes determining hand gestures formed by a user based on a sequence of images through skin of the user's wrist acquired from an infrared (i.e., near-infrared) camera. Before discussing details of this technical solution, an example AR system is reviewed in FIGS. 1A-1D.

Figure 1A:
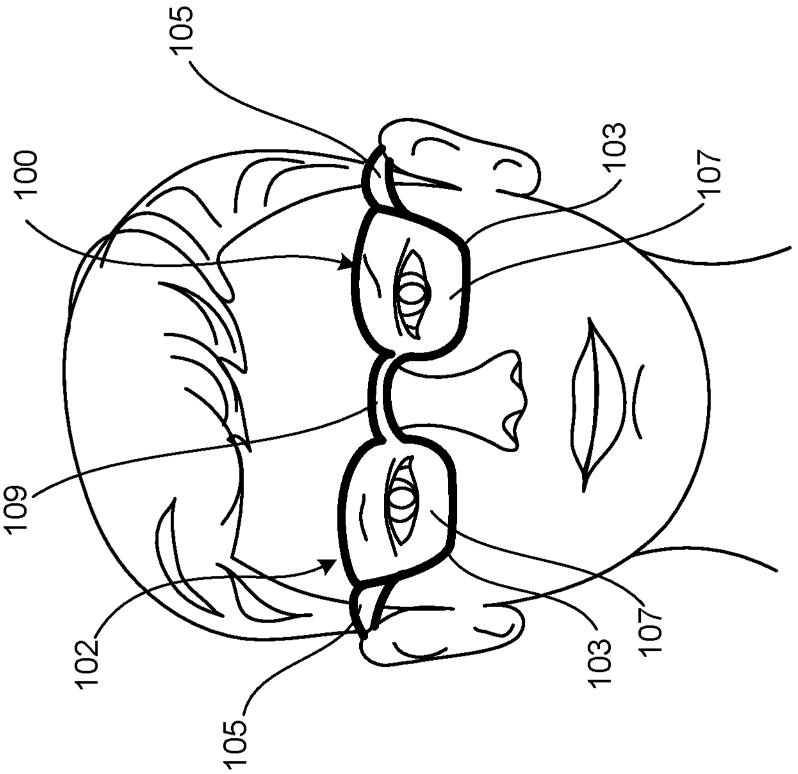
FIG. 1A illustrates an example system, in accordance with implementations described herein.
Figure 1B:
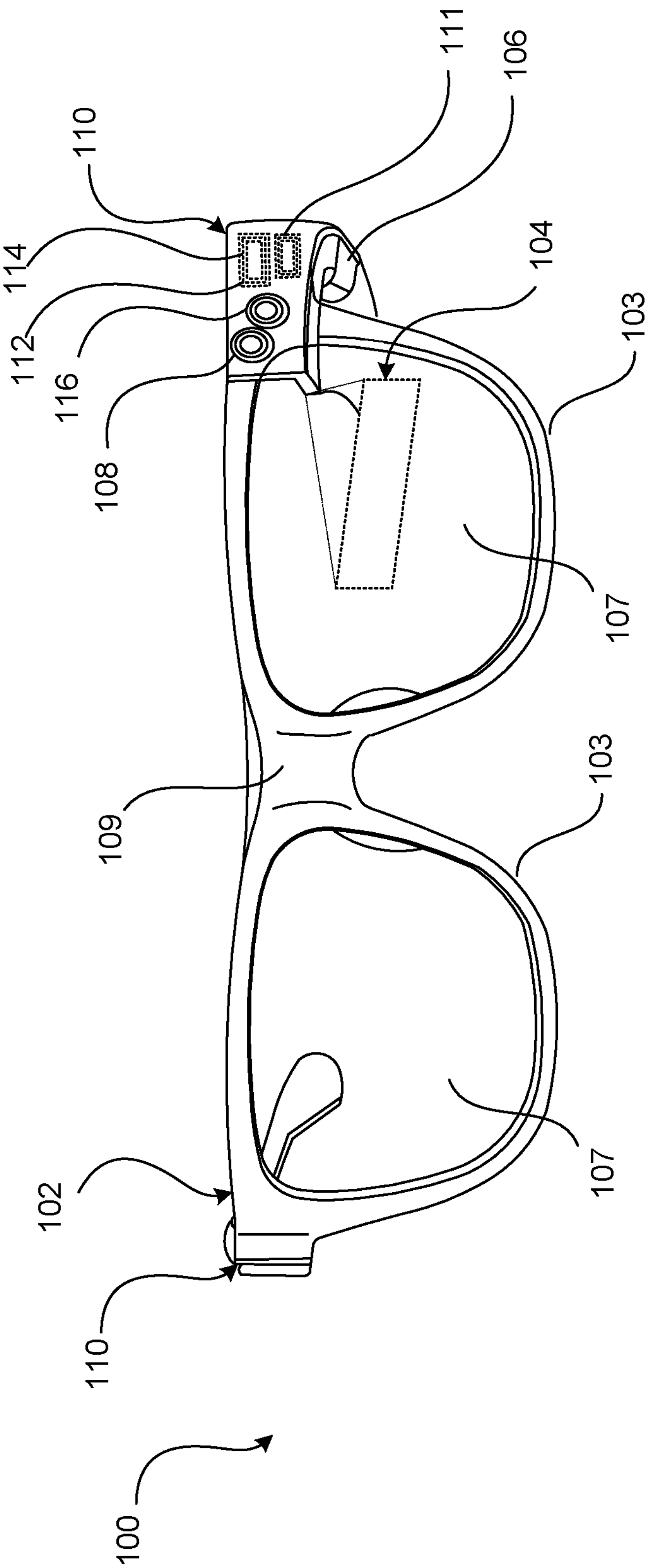
FIG. 1B is a front view.
Figure 1C:
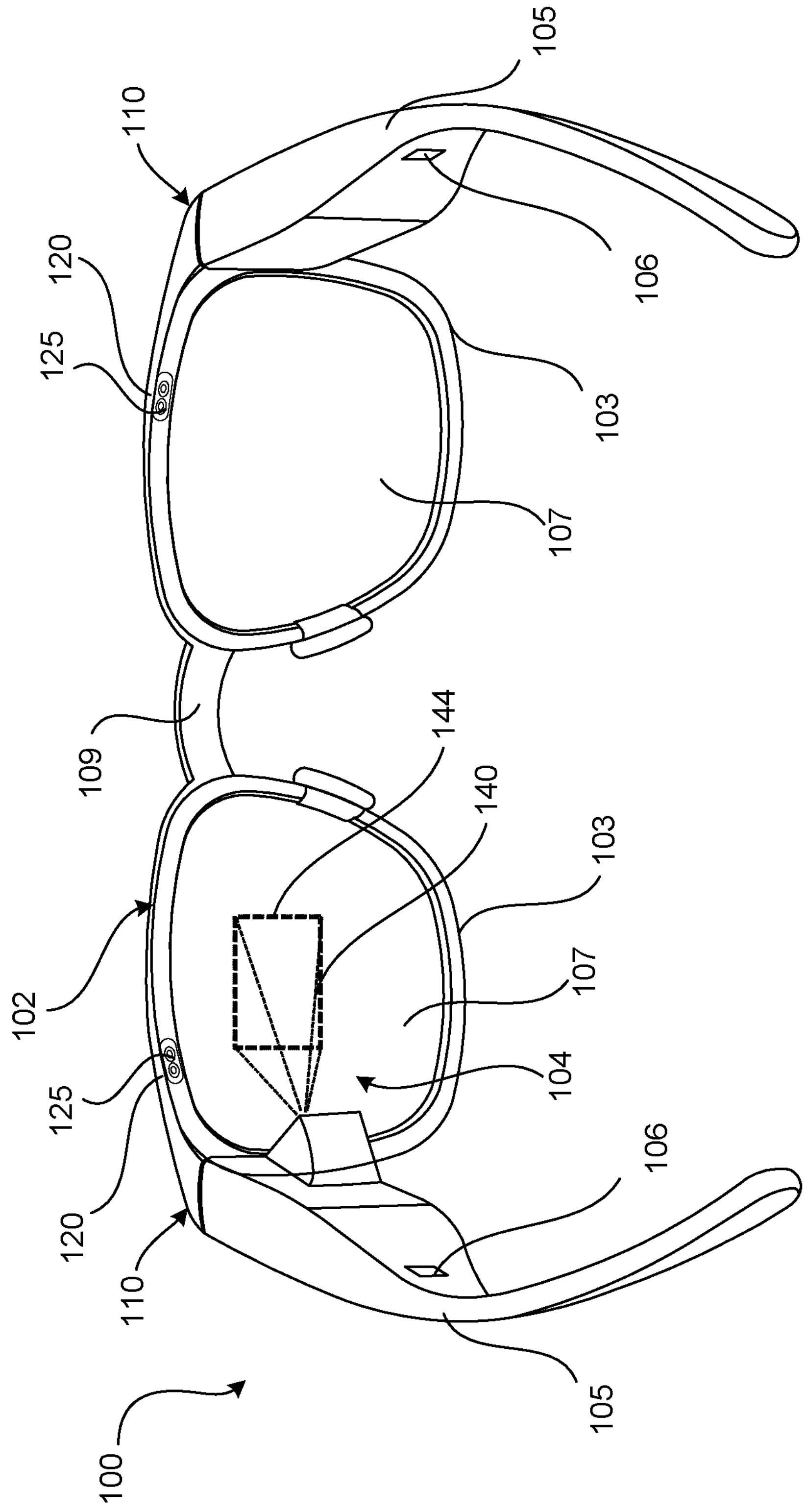
FIG. 1C is a rear view.
Figure 1D:
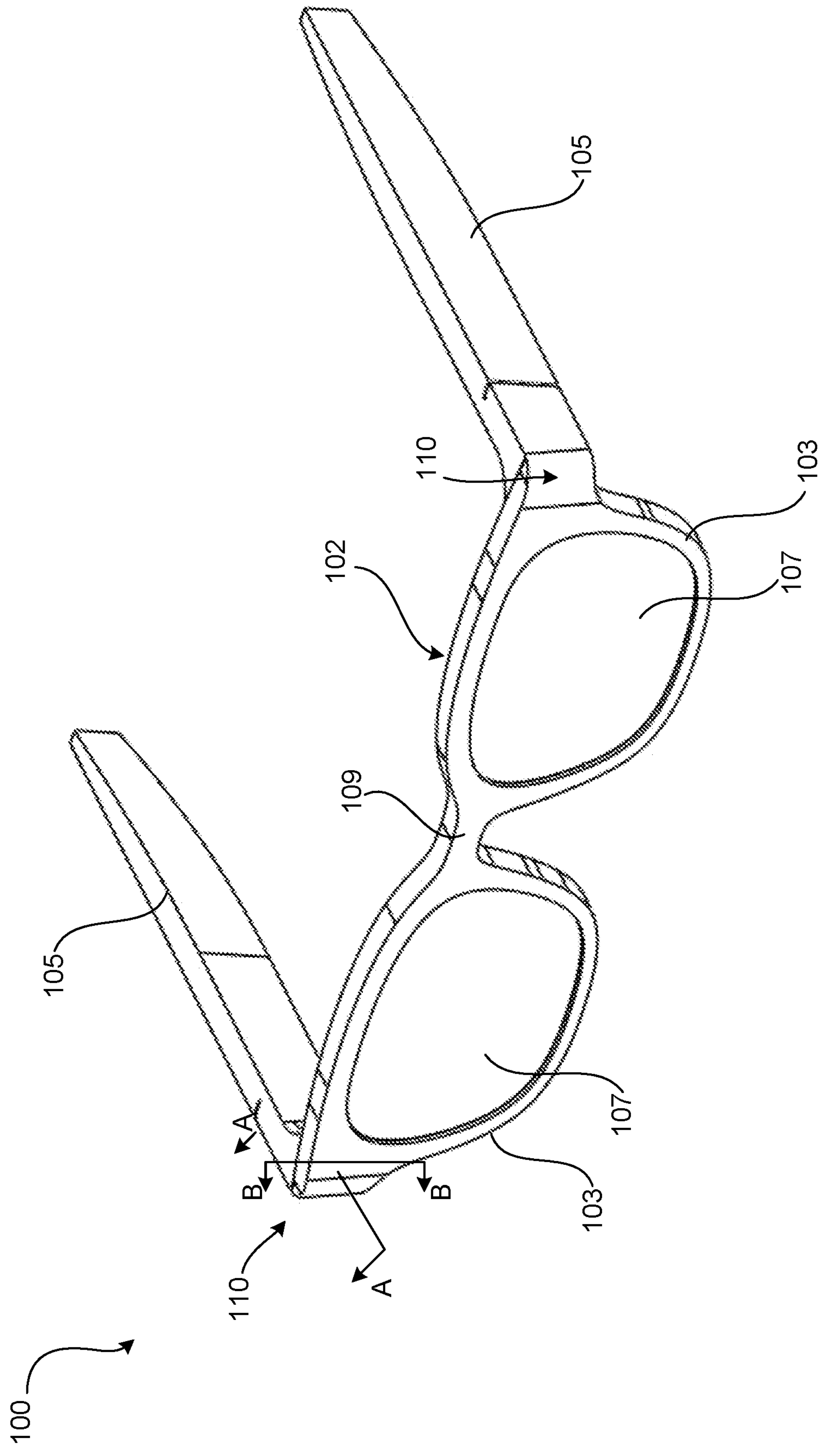
FIG. 1D is a perspective view, of the example head mounted wearable device shown in FIG. 1A, in accordance with implementations described herein.

FIG. 1A illustrates a user wearing an example head mounted wearable device for use in an augmented reality (AR) system. In this example, the example head mounted wearable device 100 is in the form of example smartglasses including display capability and computing/processing capability, for purposes of discussion and illustration. The principles to be described herein may be applied to other types of eyewear, both with and without display capability and/or computing/processing capability. FIG. 1B is a front view, FIG. 1C is a rear view, and FIG. 1D is a perspective view, of the example head mounted wearable device 100 shown in FIG. 1A. As noted above, in some examples, the example head mounted wearable device 100 may take the form of a pair of smartglasses, or augmented reality glasses.

As shown in FIGS. 1B-1D, the example head mounted wearable device 100 includes a frame 102. The frame 102 includes a front frame portion defined by rim portions 103 surrounding respective optical portions in the form of lenses 107, with a bridge portion 109 connecting the rim portions 103. Arm portions 105 are coupled, for example, pivotably or rotatably coupled, to the front frame by hinge portions 110 at the respective rim portion 103. In some examples, the lenses 107 may be corrective/prescription lenses. In some examples, the lenses 107 may be an optical material including glass and/or plastic portions that do not necessarily incorporate corrective/prescription parameters.

A display device 104 may be coupled in a portion of the frame 102. In the example shown in FIGS. 1B and 1C, the display device 104 is coupled in the arm portion 105 of the frame 102. With the display device 104 coupled in the arm portion 105, an eye box 140 extends toward the lens(es) 107, for output of content at an output coupler 144 at which content output by the display device 104 may be visible to the user. In some examples, the output coupler 144 may be substantially coincident with the lens(es) 107. In some examples, the head mounted wearable device 100 can also include an audio output device 106 (such as, for example, one or more speakers), an illumination device 108, a sensing system 111, a control system 112, at least one processor 114, and an image capture device 116, or camera 116. The camera (or image capture device) 116 may capture images via a shutter trigger, or button; the shutter trigger is configured to cause a shutter to open to allow light reflected or scattered from a scene toward the image capture device 116 to be incident on a light detector (e.g., a charged-coupled device (CCD) array, a photomultiplier, silver halide photographic film, and the like).

In some examples, the display device 104 may include a see-through near-eye display. For example, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 107, next to content (for example, digital images, user interface elements, virtual content, and the like) generated by the display device 104. In some implementations, waveguide optics may be used to depict content on the display device 104.

In some examples, the head mounted wearable device 100 may include a gaze tracking device 120 including, for example, one or more sensors 125, to detect and track eye gaze direction and movement. Data captured by the sensor(s) 125 may be processed to detect and track gaze direction and movement as a user input. In some examples, the sensing system 111 may include various sensing devices and the control system 112 may include various control system devices including, for example, one or more processors 114 operably coupled to the components of the control system 112. In some examples, the control system 112 may include a communication module providing for communication and exchange of information between the head-mounted wearable device 100 and other external devices.

The challenge for AR systems as mentioned above is providing a robust interface between the smartglasses 100 and the user. Some interfaces utilize user gestures to effect various commands. A robust interface may be able to distinguish between a thumb-index pinch and a thumb-middle finger pinch. For example, the different gestures may indicate activation of different icons on a smartglasses display or indication of different objects to move within a display field.

A conventional approach to providing a robust AR interface includes using a world-facing RGB camera mounted on a smartglasses frame to provide images from which a skeletal hand track for full hand/finger interaction and gesture deduction. That is, the RGB camera mounted on a frame hinge would track hand and/or finger motions of a user's hand and thereby deduce a gesture and effect a command associated with the gesture.

Nevertheless, there can be issues related to the use of a world-facing RGB camera. For example, such a world-facing RGB camera mounted on a frame of the smartglasses, usually near a hinge, has a camera sensor and an image stack processor (ISP) that consume a relatively large amount of power. Dur to this large power consumption, a technical problem with using RBG images from the world-facing RGB camera to deduce user gestures is that the world-facing RGB camera can only be used sparingly. For example, using the world-facing RGB camera, the on-board sensors can only detect gestures a few times a day based on the camera's power consumption. Moreover, the frame rate—which should be about 30 frames per second to get the sort of resolution for fine hand movement distinctions, may be less than 5 frames per second in operation with a high latency.

Moreover, even if the technical problem of high power consumption could be overcome, there is another technical problem involving possible occlusion within a narrow field of view; if hands and/or fingers are not visible within the display field, then the gesture detection will not work.

There is some evidence that optical measurements of changes in a perfusion index (PI)—a ratio of pulsatile blood flow rate to non-pulsatile blood flow rate—contains useful information about hand and finger movements. This evidence is presented in FIGS. 2A-2B. Readily available LED-photodiode (PD) pairs in commodity smartwatches could provide a spatially sparse PI change measurement which could be used to distinguish among some gestures that are separated widely from an interaction point of view, e.g., pinch vs. hand wave, that are easy to distinguish. Nevertheless, this sparse optical array is ill-equipped to provide the fine distinctions sought here.

In accordance with the implementations described herein, a technical solution to the above-described technical problem includes determining hand gestures formed by a user based on a sequence of images through skin of the user's wrist acquired from a near-infrared camera. Specifically, an image capture device disposed on a band worn around a user's wrist includes a source of electromagnetic radiation, e.g., light-emitting diodes (LEDs) in the infrared (IR) wavelength band (e.g., a narrow band around about 850 nm) that emit the radiation into the user's wrist and an IR detector which produces the sequence of two-dimensional images of a region within a dermal layer in the user's wrist. From this sequence, gesture detection circuitry determines values of a biological flow metric, e.g., a change in perfusion index (PI) between frames of the sequence, based on a trained model that generates the metric from the sequence. Finally, the gesture detection circuitry maps the values of the biological flow metric to specific hand and/or finger movements that determine a gesture.

In some implementations, the trained model includes a convolutional regression neural network that is trained based on a dataset including sequences of two-dimensional images and corresponding values of the biological metric, e.g., PI change.

In some implementations, the LEDs are arranged on either side (e.g., left and right) of the detector. In some implementations, the detector forma a left channel and a right channel for radiation emitted from the LEDs. The sequence of two-dimensional images then includes a left sequence and a right sequence from which the PI change is determined.

In some implementations, a source of IR electromagnetic radiation is located on a camera that also includes the detector.

A technical advantage of the technical solution is that, in contrast to the conventional approaches, uses sufficiently low power so that the image capture device is always available and able to provide a high frame rate (e.g., 30 frames per second) and low latency (e.g., about 10 milliseconds). Moreover, occlusion is no longer an issue as the illumination and detector are positioned a few millimeters from the wrist. Specifically, a z-depth of a band on which the image capture device is mounted is controlled by the z-depth of the image capture device than, say, a mount height on the smartglasses frame.

Before describing the image capture device and gesture detection circuitry configured to determine a gesture based on a sequence of two-dimensional images of an interior of a user's wrist, it will be helpful to explain the principle of operation. This principle is explained in FIGS. 2A-2B.

Figure 2A:
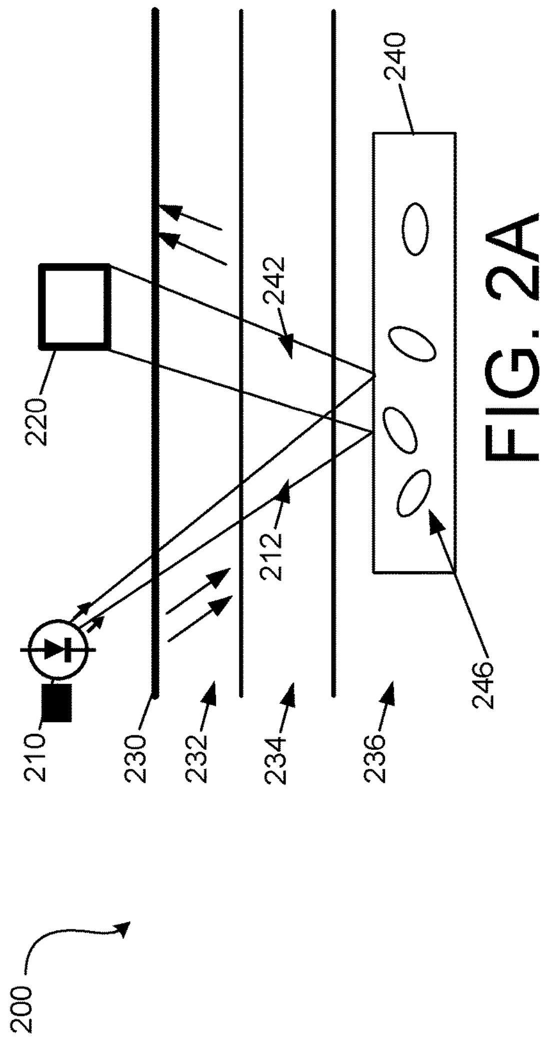
FIG. 2A is a diagram illustrating an example illumination of a capillary vessel in hypodermic tissue with an infrared (IR) light-emitting diode (LED).

FIG. 2A is a diagram 200 illustrating an example illumination of a capillary vessel 240 in hypodermic tissue 236 with an infrared (IR) light-emitting diode (LED) 210. As shown in FIG. 2A, the IR LED emits radiation 212 in an IR wavelength band (e.g., a narrow band around about 850 nm). The radiation 212 is configured to pass through the skin surface 230, the stratum corneum 232 and the epidermis 234 without excessive drop-off in brightness, i.e., the Beer-Lambert coefficient is sufficiently small.

As shown in FIG. 2A, the radiation 212 is incident on a capillary vessel 240. As also shown in FIG. 2A, the capillary vessel 240 contains flowing blood. The flowing blood contains erythrocytes 246, e.g., hemoglobin molecules that can absorb the radiation 212. The radiation 212 is reflected from the capillary vessel 240 to produce reflected radiation 242 that propagates through the dermis 236, epidermis 234, stratum corneum 232, and skin surface 230 to an IR detector 220 which then samples a signal produced by the reflected radiation 242 at a specified sample rate. For example, the IR detector 220 is a photoplethysmography (PPG) sensor.

Figure 2B:
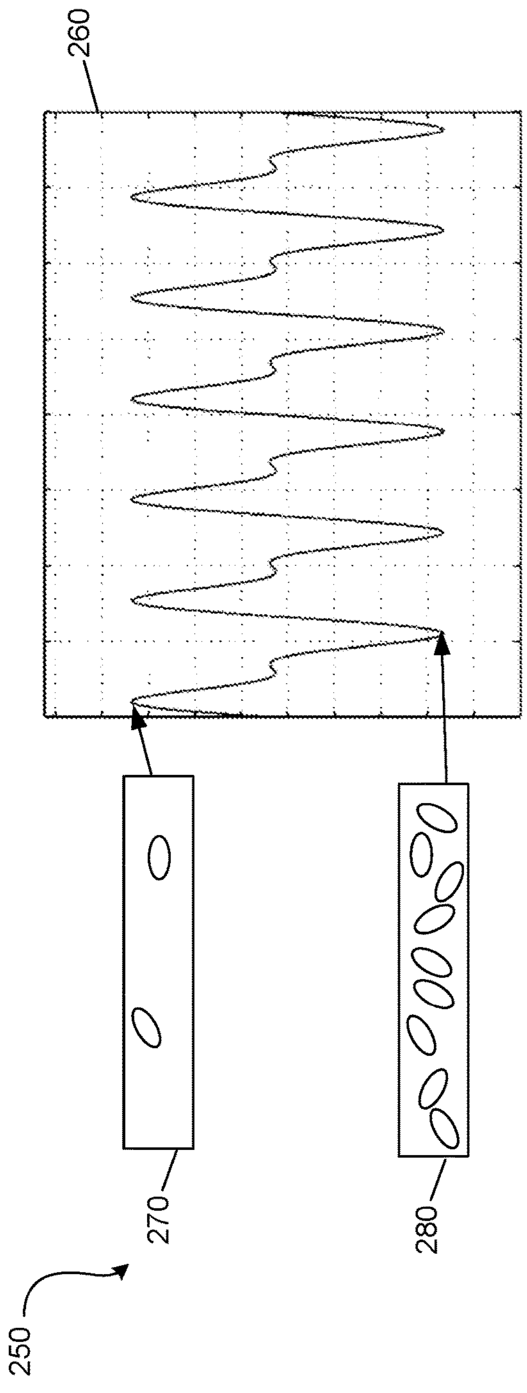
FIG. 2B is a diagram illustrating an example signal with strength dependent on erythrocyte density in a capillary vessel.

FIG. 2B is a diagram 250 illustrating an example signal 260 generated by the PPG sensor 220. As shown in FIG. 2B, the strength of the signal 260 depends on erythrocyte density in a capillary vessel 270, 280. Specifically, because the erythrocytes absorb IR radiation, the capillary vessel 270 with a low erythrocyte density produces a signal peak because little of the radiation 212 has been absorbed. In contrast, the capillary vessel 280 with a high erythrocyte density produces a signal trough because much of the radiation 212 has been absorbed.

Moreover, there is further evidence that hand and finger movements cause various erythrocyte densities in capillary vessels. For example, a grasping motion can cause an increase in erythrocyte density in capillary vessels, which is seen as a dip in signal strength at a PPG detector. This indicates that IR radiation signal strength may indicate hand and/or finger movements, and such movements may define gestures formed by users of an AR system.

Moreover, further analysis has demonstrated that such relationships between signal strength/radiation intensity and hand/finger movements may be captured using optical detectors in off-the-shelf cameras, such as those found in an Intel® RealSense Depth Camera D435, repurposed for on-wrist sensing. An advantage of using such a camera rather than a small pixel detector such as a PPG detector is that the camera may generate sequences of larger field, two-dimensional images. Such images provide the resolution needed for fine hand and finger motion distinction.

Figure 3:
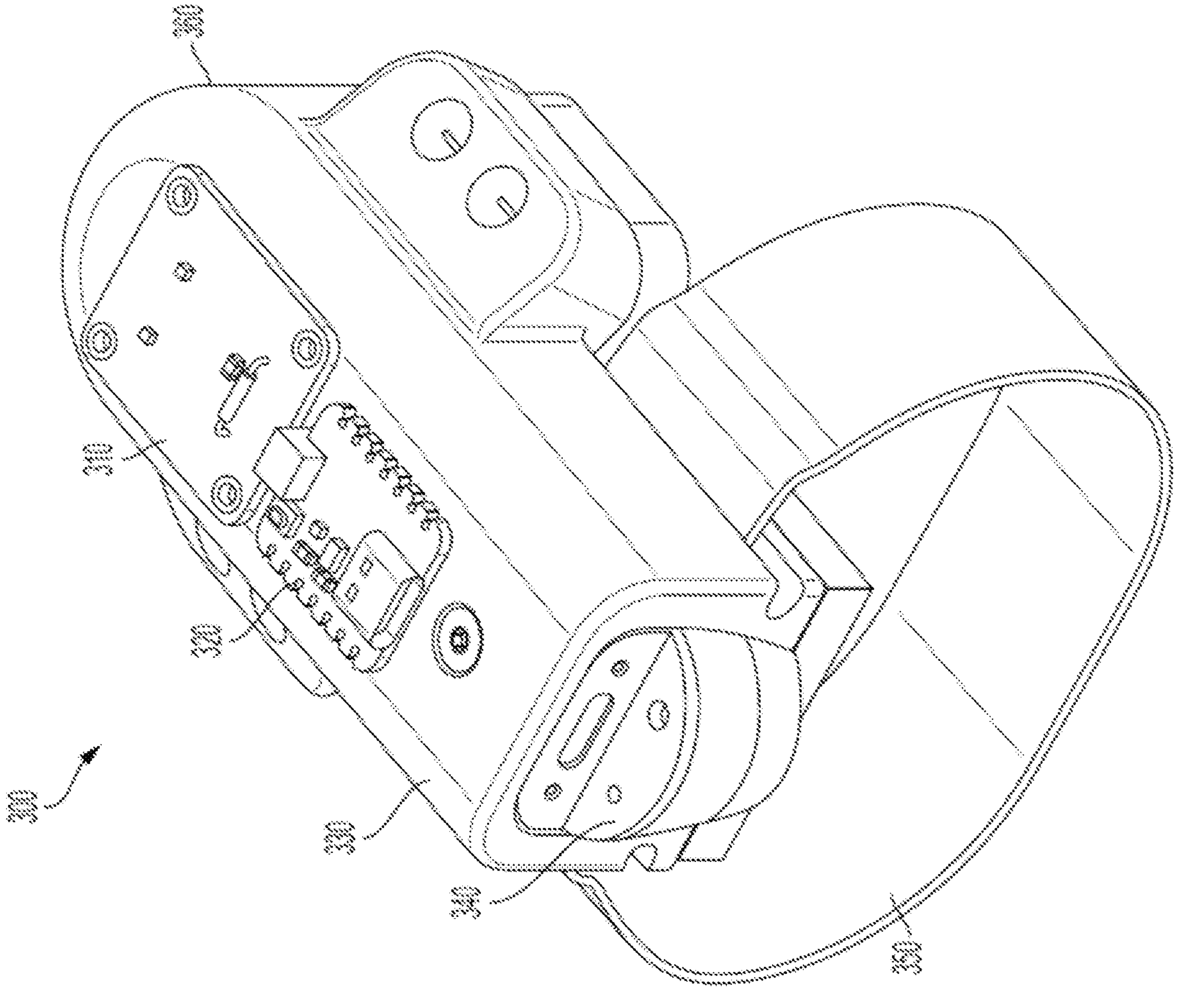
FIG. 3 is a diagram that illustrates an example wrist-mounted image capture device.

FIG. 3 is a diagram that illustrates an example wrist-mounted image capture device 300. The wrist-mounted image capture device 300 includes a LED driver 310, a LED microcontroller 320, a mount 330, a camera 340, and an adjustable elastic wristband 350. As shown in FIG. 3, the wrist-mounted image capture device 300 includes or is connected to gesture detection circuitry 360. This is but one example of an image capture device and is not meant to be limiting.

The LED driver 310 is configured to provide a current to LED radiation sources such that the brightness of the emitted radiation is relatively stable. This stability may be accomplished through the provision of a constant current to the LEDs so that the intensity does not vary if, e.g., the power supply dips. Keeping the brightness stable is important so that noisy variations of the intensity of the radiation are suppressed. Such variations may cause difficulties in determining biological fluid flow metrics (e.g., PI changes between frames). An example LED driver 310 is an Adafruit 12-channel 16-bit PWM LED driver from Adafruit Industries, LLC.

The LED microcontroller 320 is configured to control emission of the LED radiation according to a specified pattern or schedule. For example, in order to effect the generation of a sequence of two-dimensional images, the LED microcontroller 320 may cause the LED radiation sources to flash at a specified frequency (e.g., 30 times per second to produce a desired frame rate). An example LED microcontroller 320 us an Adafruit QT Py 0 SAMD21 Dev Board from Adafruit Industries, LLC.

The mount 330 is a 3D printed holder configured to hold the camera 340 in place within the image capture device 300. In some implementations, the mount 330 is attached to the camera 340 using two M3 screws. The mount 330 also includes a groove through which the wristband 350 may be slid and locked into place. Again, this is but one example and should not be limiting.

The camera 340 is configured to receive reflected radiation from the interior of the user's wrist and generate frames, or two-dimensional images over a specified field of view (e.g., 90 degrees by 60 degrees). In some implementations, the specified field of view is significantly larger in either dimension (e.g., x or y) than an angular extent of the distance from the camera to the interior of the user's wrist. An example camera 340 is an Intel® RealSense Depth Camera D435, made by Intel Corp. In some implementations, the images are raw images that are formatted for comparison between frames, e.g., for absolute differences. In such implementations, the images may be normalized to prevent or minimize drifting of intensity values over time. Further details of the camera 340 are shown with regard to FIG. 4.

Figure 4:
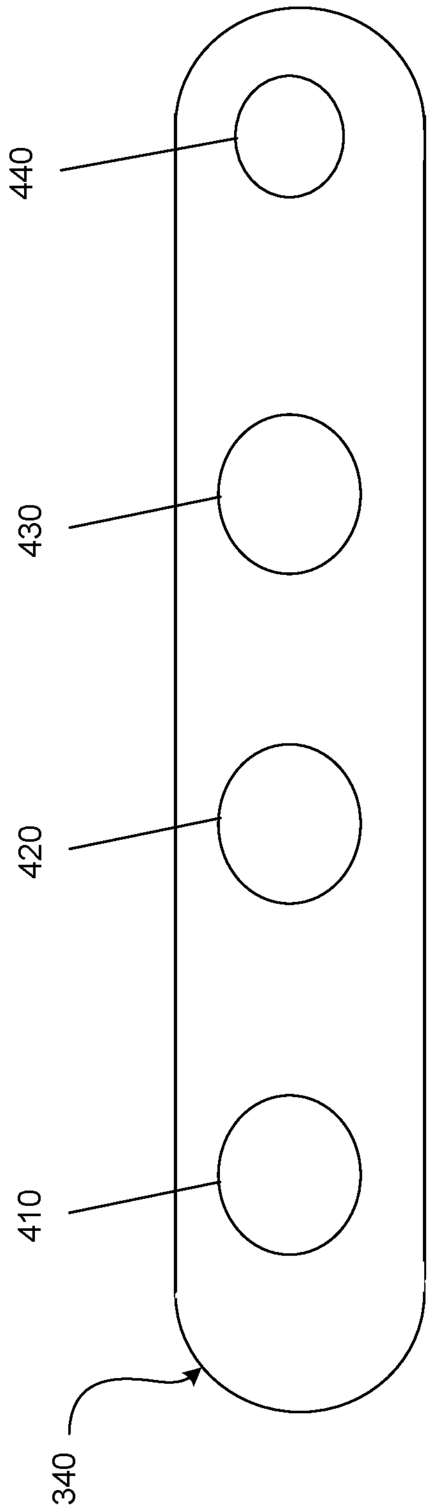
FIG. 4 is a diagram that illustrates an example camera for detecting IR and/or RGB illumination in a pair of channels within the wrist-mounted image capture device.

FIG. 4 is a diagram that illustrates the camera 340 for detecting radiation in a pair of channels within the wrist-mounted image capture device 300. As shown in FIG. 4, the camera 340 includes a right imager 410, an IR projector 420, a left imager 430, and a RGB module 440.

The left imager 430 and right imager 410 are each configured to receive radiation reflected from the wrist interior and form respective images on detectors. In some implementations, the left imager 430 and the right imager 410 each include optics configured to focus the received radiation onto the respective detectors. In some implementations, the optics and the detectors are configured for IR radiation, e.g., a narrow band around 850 nm. In some implementations, the left imager 430 and right imager 410 (i.e., left and right channel detectors) capture their respective images substantially simultaneously. This allows for more accurate gesture detection from both hands.

The IR projector 420 is co-located with the left imager 430 and right imager 410 in a single housing (i.e., a camera housing) and is configured to emit IR radiation onto and into the user's wrist for backreflection. In some implementations, the IR projection includes a laser that emits in the IR, e.g., in a narrow band around 850 nm. In some implementations, the IR projector 420 is configured to emit IR radiation into one of the left imager 430 or the right imager 410. In some implementations, the IR projector 420 includes a splitter so that IR radiation is reflected back to both the left projector 430 and right projector 410. In some implementations, the IR projector 420 is soldered to the same circuit board as the left projector 430 and right projector 410.

The RGB module 440 is configured to produce and/or detect illumination in the visible spectrum. In some cases, radiation in the red end of the visible spectrum can have significant brightness (i.e., sufficiently small Beer-Lambert coefficient) in the interior of the wrist. Accordingly, the RGB module 440 can provide an alternative imagine platform for generating frames for gesture detection.

It is noted that the camera 340 as described above is merely one example and is not meant to be limiting. For example, the camera 340 need not include the RGB module 440.

Figure 5:
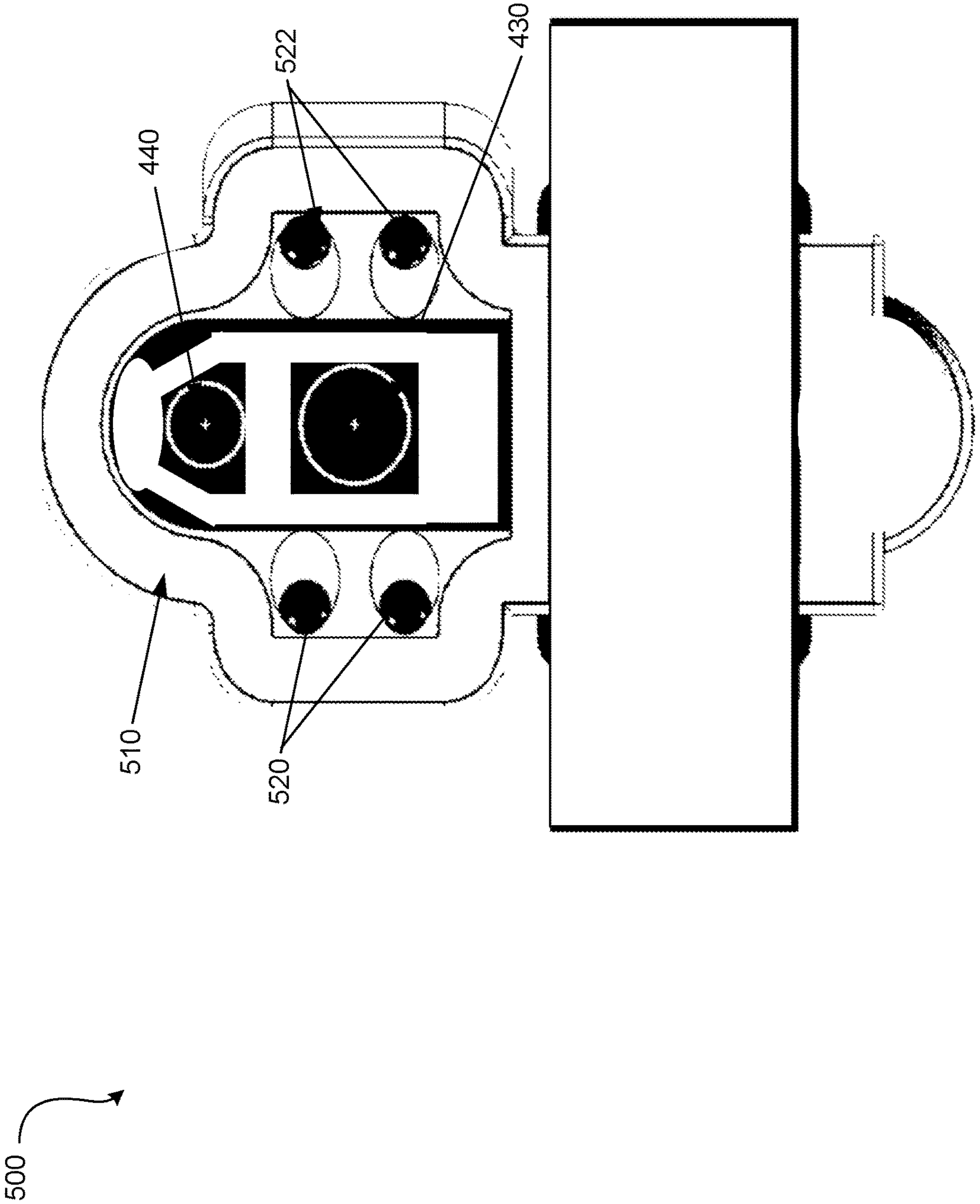
FIG. 5 is a diagram that illustrates a bottom view of the example wrist-mounted image capture device.

FIG. 5 is a diagram that illustrates a bottom view 500 of the wrist-mounted image capture device 300. As shown in FIG. 5, the wrist-mounted image capture device 300 further includes a radiation baffle 510 and IR LED pairs 520 and 522.

The radiation baffle 510 is configured to block radiation from leaking through the wrist-mounted image capture device 300. In some implementations, the radiation baffle 510 is constructed from a sift polyurethane foam for the user's comfort while wearing the wrist-mounted image capture device 300. In some implementations, the radiation baffle 510 is about one-quarter inch thick and is safe for use for contact with the user's skin.

The IR LED pairs 520 and 522 are configured to emit IR radiation into the interior of the user's wrist for backreflection into the left imager 430 and right imager 410, respectively. An example of IR LEDs used in the wrist-mounted image capture device 300 are GaAlAs Double Hetero high speed IR emitting diodes centered at 850 nm, manufactured by Vishay Semiconductors. It is noted that the radiation may be provided by the IR LEDs 520 and/or 522, and/or the IR projector 420. Further details regarding configuration of the IR LEDs is shown in FIG. 6.

Figure 6:
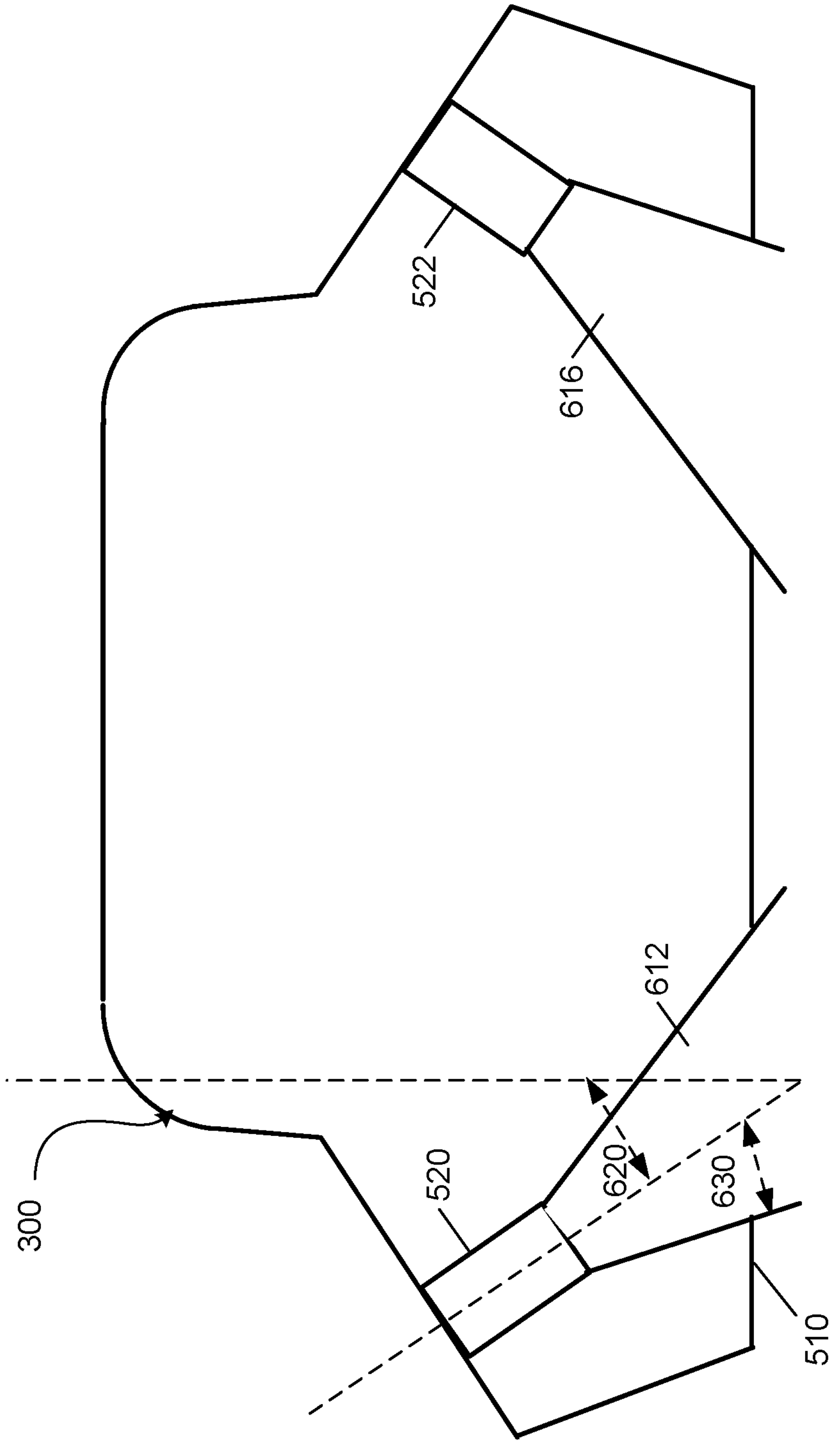
FIG. 6 is a diagram that illustrates a side view of the example wrist-mounted image capture device, with illumination provided by IR LEDs.

FIG. 6 is a diagram that illustrates a planar side view of the example wrist-mounted image capture device 300, with radiation provided by IR LED pairs 520 and 522. The diagram illustrated in FIG. 6 shows only the LED pairs 520 and 522 and the respective radiation beams 612 and 616 they emit.

It is assumed in FIG. 6 that the LED pairs 520 and 522 are placed symmetrically with respect to one another so that the description of the configuration of LED pair 520 applies to LED pair 522 as well. As shown in FIG. 6, the LEDs in LED pair 520 are aligned with the housing 330 of the wrist-mounted image capture device 300. Accordingly, because of the geometry of the housing 330, each LED of LED pair 520 has an axis of symmetry oriented at an angle 620 with respect to a normal of a surface of the radiation baffle 510. In some implementations, the angle 620 is substantially equal to 35 degrees.

The beam of radiation 612 has a half-divergence angle 630 defined by a half-intensity of the radiation emitted by the LED pair 520 with respect to the intensity maximum emitted along the axis of symmetry. In some implementations, a full divergence angle, i.e., twice the half-divergence angle 630 is substantially equal to 22 degrees. The angles 620 and 630 are important in placement of the IR detectors with respect to the LED pairs 520 and 522.

Returning to FIG. 3 and as previously stated, the wrist-mounted image capture device 300 includes gesture detection circuitry 360. The gesture detection circuitry 360 is configured to determine a biological fluid flow metric, e.g., a PI change across frames and accordingly determine a gesture based on the biological fluid flow metric. Further details regarding the gesture detection circuitry 360 are shown with regard to FIG. 7.

Figure 7:
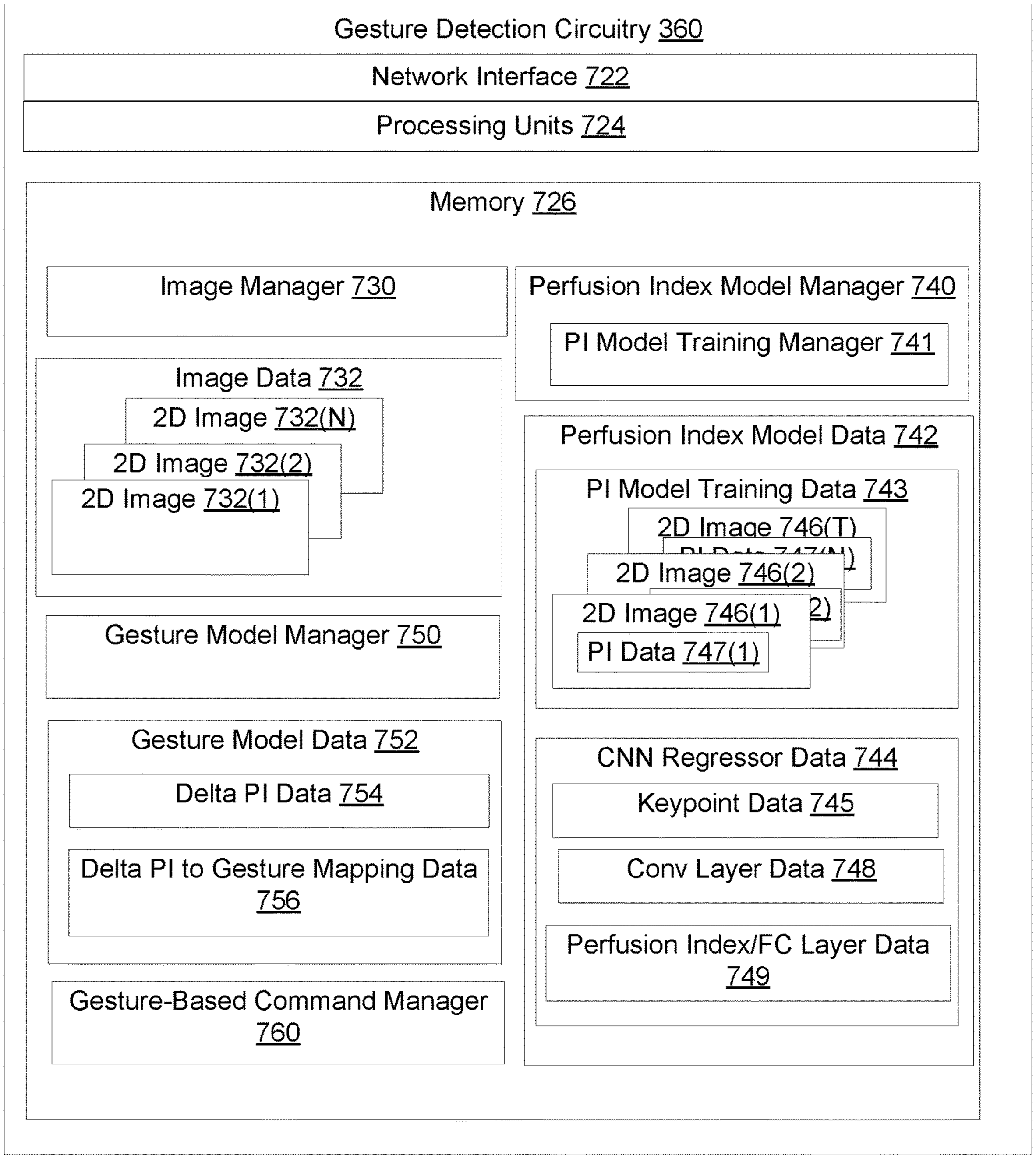
FIG. 7 is a diagram that illustrates example gesture detection circuitry.

FIG. 7 is a diagram that illustrates example gesture detection circuitry 360 connected to or embedded in the wrist-mounted image capture device 300. The gesture detection circuitry 360 is configured to receive a sequence of two-dimensional images from the camera 340 and determine a gesture formed by the user while the sequence of images was being generated.

The gesture detection circuitry 360 includes a network interface 722, one or more processing units 724, and non-transitory memory 726. The network interface 722 includes, for example, Ethernet adaptors, Token Ring adaptors, and the like, for converting electronic and/or optical signals received from the network to electronic form for use by the gesture detection circuitry 360. The set of processing units 724 include one or more processing chips and/or assemblies. The memory 726 includes both volatile memory (e.g., RAM) and non-volatile memory, such as one or more ROMs, disk drives, solid state drives, and the like. The set of processing units 724 and the memory 726 together form controlling circuitry, which is configured and arranged to carry out various methods and functions as described herein.

In some implementations, one or more of the components of the gesture detection circuitry 360 can be, or can include processors (e.g., processing units 724) configured to process instructions stored in the memory 726. Examples of such instructions as depicted in FIG. 7 include an image manager 730, a perfusion index model manager 740, a gesture model manager 750, and a gesture-based command manager 760. Further, as illustrated in FIG. 7, the memory 726 is configured to store various data, which is described with respect to the respective managers that use such data.

The image manager 730 is configured to obtain image data 732 from the camera 340 of the wrist-mounted image capture device 300. In some implementations, the image manager 730 obtains the image data 732 over a network via the network interface 722. In some implementations, the image manager 730 obtains the image data 732 over a direct connection. In some implementations, the image manager 730 obtains the image data 732 from a local storage device.

The image data 732 represents a sequence of two-dimensional images 732(1), 732(2), . . . , 732(N) captured by the wrist-mounted image capture device 300. The image data 732 in some implementations represents samples of images take over a specified field in the interior of a user's wrist. In some implementations, each of the sequence 732(1), 732(2), . . . , 732(N) takes the form of a heat map indicating values of a biological fluid flow metric, e.g., perfusion index at various key points within the specified field.

The sequence 732(1), 732(2), . . . , 732(N) captured by the wrist-mounted image capture device 300 represent, in some implementations, two-dimensional images taken at a specified period, e.g., at a specified frame rate. In some implementations, the frame rate is 30 frames per second, i.e., frames in the sequence 732(1), 732(2), . . . , 732(N) are taken 1/30 second apart. A higher frame rate provides better temporal resolution for determining changes in the biological fluid flow metric at the key points. Moreover, if the sequence 732(1), 732(2), . . . , 732(N) is captured with low latency, then the gesture is accurately determined in real time. In FIG. 7, the biological fluid flow rate is shown to be perfusion index (PI), or more specifically, change in PI between frames.

In some implementations, the sequence 732(1), 732(2), . . . , 732(N) includes more than one independent channel, e.g., a left channel and right channel from the left detector 430 and right detector and 410 in camera 340. In such implementations, the frames from different channels are modeled independently of one another.

The PI model manager 740 is configured to generate a PI model represented by PI model data 742 that maps the image data 732 to a change in PI over time. As shown in FIG. 7, the PI model is a supervised model, specifically a convolutional regressor neural network, or a convolutional neural network with regressor. In this context, a regressor is a set of key points in the sequence of two-dimensional images 732(1), 732(2), . . . , 732(N) at which the PI is evaluated. The model as described here is just one example and should not be taken to be limiting. The PI model manager 740 includes a PI model training manager 741.

The PI model training manager 741 is configured to generate CNN regressor data 744 based on PI model training data 743. PI model training data 743 includes a corpus of sequences of two-dimensional images 746(1), . . . , 746(T) and corresponding PI data 747(1), . . . , 747(T) representing PI values, or changes in PI values between adjacent frames at key points represented by keypoint data 745. The PI model training manager 741 uses the PI model training data 743 and a Euclidean loss function to generate parameters of hidden layers represented by convolutional layer data 748 with, in some implementations pooled layers and/or skip connections. The PI model manager 740 then predicts PI values at a final fully connected layer represented by PI/FC layer data 749.

The gesture model manager 750 is configured to use gesture model data 752, e.g., delta PI data 754 representing PI changes between adjacent frames as taken from the FC layer data 749, to predict a gesture or gestures formed by a user while the image data 732 was captured.

In some implementations and as shown in FIG. 7, the gesture model manager 750 predicts gestures based on a delta PI to gesture mapping data 756. In some implementations, the mapping data 756 includes a lookup table that includes values of delta PI and identifiers of hand and finger movements, e.g., "right grasp," "left thumb-index finger pinch," etc. In some implementations, the identifiers are numerals.

In some implementations, the gesture model manager 750 predicts gestures using a supervised neural network trained using PI values and corresponding finger/hand motions. In some implementations, the finger/hand motions are represented as embeddings, i.e., low-dimensional vectors.

The gesture-based command manager 760 performs an action based on a gesture predicted by the gesture model manager 750. For example, a grasping motion may cause the gesture-based command manager 760 to search the AR display for an object within its field of view to grab, and then move the object through the field of view according to the movement of the gesture.

The components (e.g., modules, processing units 724) of gesture detection circuitry 360 can be configured to operate based on one or more platforms (e.g., one or more similar or different platforms) that can include one or more types of hardware, software, firmware, operating systems, runtime libraries, and/or so forth. In some implementations, the components of the gesture detection circuitry 360 can be configured to operate within a cluster of devices (e.g., a server farm). In such an implementation, the functionality and processing of the components of the gesture detection circuitry 360 can be distributed to several devices of the cluster of devices.

The components of the gesture detection circuitry 360 can be, or can include, any type of hardware and/or software configured to process attributes. In some implementations, one or more portions of the components shown in the components of the gesture detection circuitry 360 in FIG. 7 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the gesture detection circuitry 360 can be, or can include, a software module configured for execution by at least one processor (not shown). In some implementations, the functionality of the components can be included in different modules and/or different components than those shown in FIG. 7, including combining functionality illustrated as two components into a single component.

Although not shown, in some implementations, the components of the gesture detection circuitry 360 (or portions thereof) can be configured to operate within, for example, a data center (e.g., a cloud computing environment), a computer system, one or more server/host devices, and/or so forth. In some implementations, the components of the gesture detection circuitry 360 (or portions thereof) can be configured to operate within a network. Thus, the components of the gesture detection circuitry 360 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the search system can be, or can include, processors configured to process instructions stored in a memory. For example, image manager 730 (and/or a portion thereof), a PI model manager 740 (and/or a portion thereof), gesture model manager 750 (and/or a portion thereof), and gesture-based command manager 760 (and/or a portion thereof) are examples of such instructions.

In some implementations, the memory 726 can be any type of memory such as a random-access memory, a disk drive memory, flash memory, and/or so forth. In some implementations, the memory 726 can be implemented as more than one memory component (e.g., more than one RAM component or disk drive memory) associated with the components of the gesture detection circuitry 360. In some implementations, the memory 726 can be a database memory. In some implementations, the memory 726 can be, or can include, a non-local memory. For example, the memory 726 can be, or can include, a memory shared by multiple devices (not shown). In some implementations, the memory 726 can be associated with a server device (not shown) within a network and configured to serve the components of the gesture detection circuitry 360. As illustrated in FIG. 7, the memory 726 is configured to store various data, including image data 732, PI model data 742, and gesture model data 752.

Figure 8:
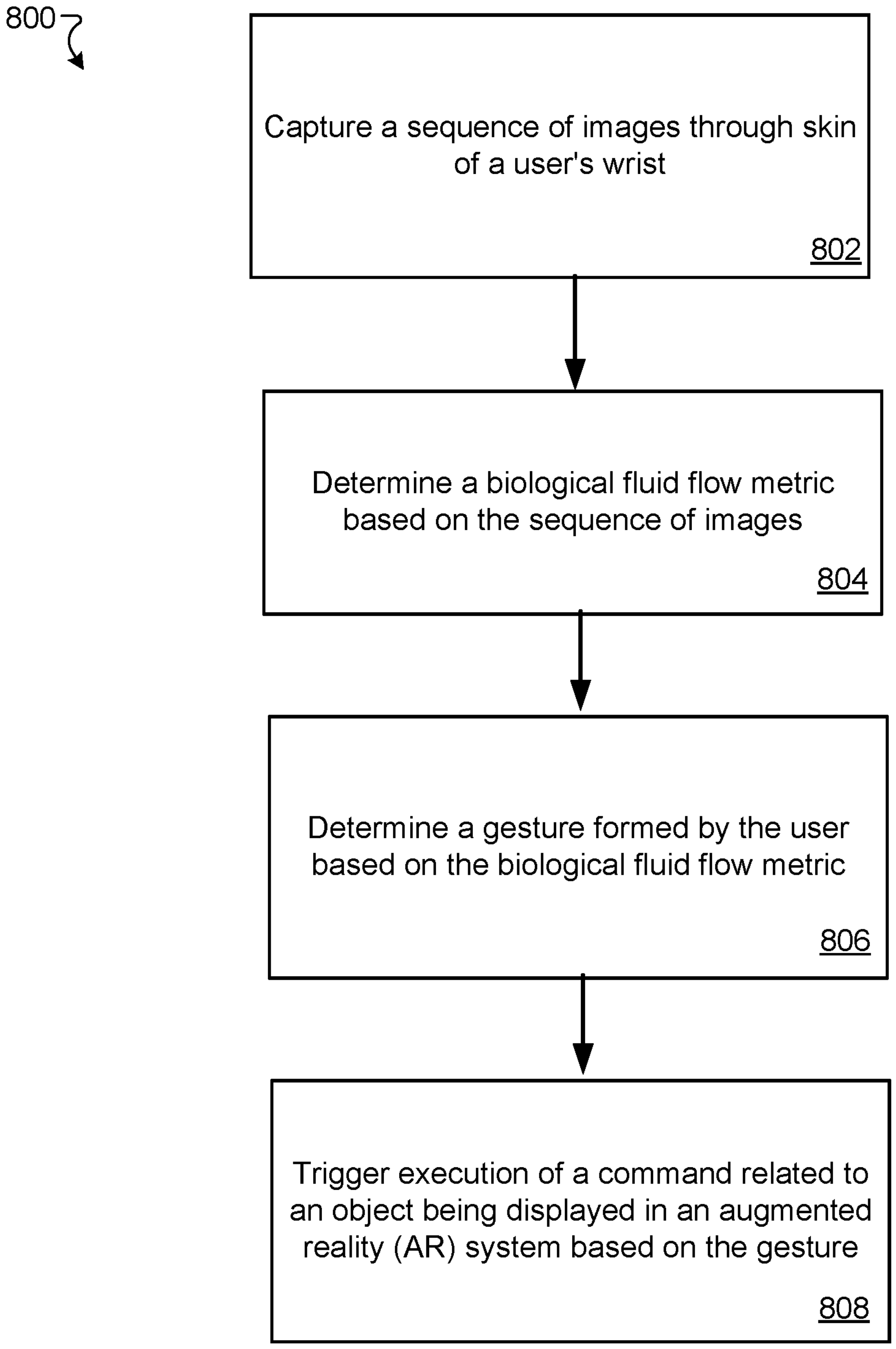
FIG. 8 is a flow chart that illustrates an example method, according to disclosed implementations.

FIG. 8 is a flow chart depicting an example method 800 of determining gestures based on a sequence of two-dimensional images of an interior of a user's wrist. The method 800 may be performed by software constructs described in connection with FIG. 7, which reside in memory 726 of the gesture detection circuitry 360 and are run by the set of processing units 724.

At 802, the image capture device 300 captures a sequence of images (e.g., sequence of two-dimensional images 732 (1), 732(2), . . . , 732(N)) through skin of a user's wrist. For example, upon a formation of a gesture by the user, the image capture device 300 causes a radiation source (e.g., IR LEDS 520, 522) to illuminate a region within the interior of the user's wrist, i.e., in a dermal layer in which blood flows in capillary vessels. The radiation is backreflected toward IR detectors (e.g., detectors 430 and 410) which forms two-dimensional images. The sequence is formed by a LED microcontroller 420 that, e.g., flashes the LEDs on and off at a specified frame rate.

At 804, the PI model manager 740 determines a biological fluid flow metric (e.g., change in or delta PI between frames of the sequence) based on the sequence of images 732(1), 732(2), . . . , 732(N). The model is a convolutional neural network with regressor which takes in key point data 745 representing key points for the regressor and predicts a change in PI between frames of the sequence of two-dimensional images 732(1), 732(2), . . . , 732(N).

At 806, the gesture model manager 750 determines a gesture formed by the user based on the biological fluid flow metric, e.g., change in PI between frames of the sequence of two-dimensional images 732(1), 732(2), . . . , 732(N). This determination may be made using, e.g., a lookup table or a supervised predictive model.

At 808, the gesture-based command manager 760 triggers execution of a command related to an object being displayed in an AR system based on the gesture.

Figure 9:
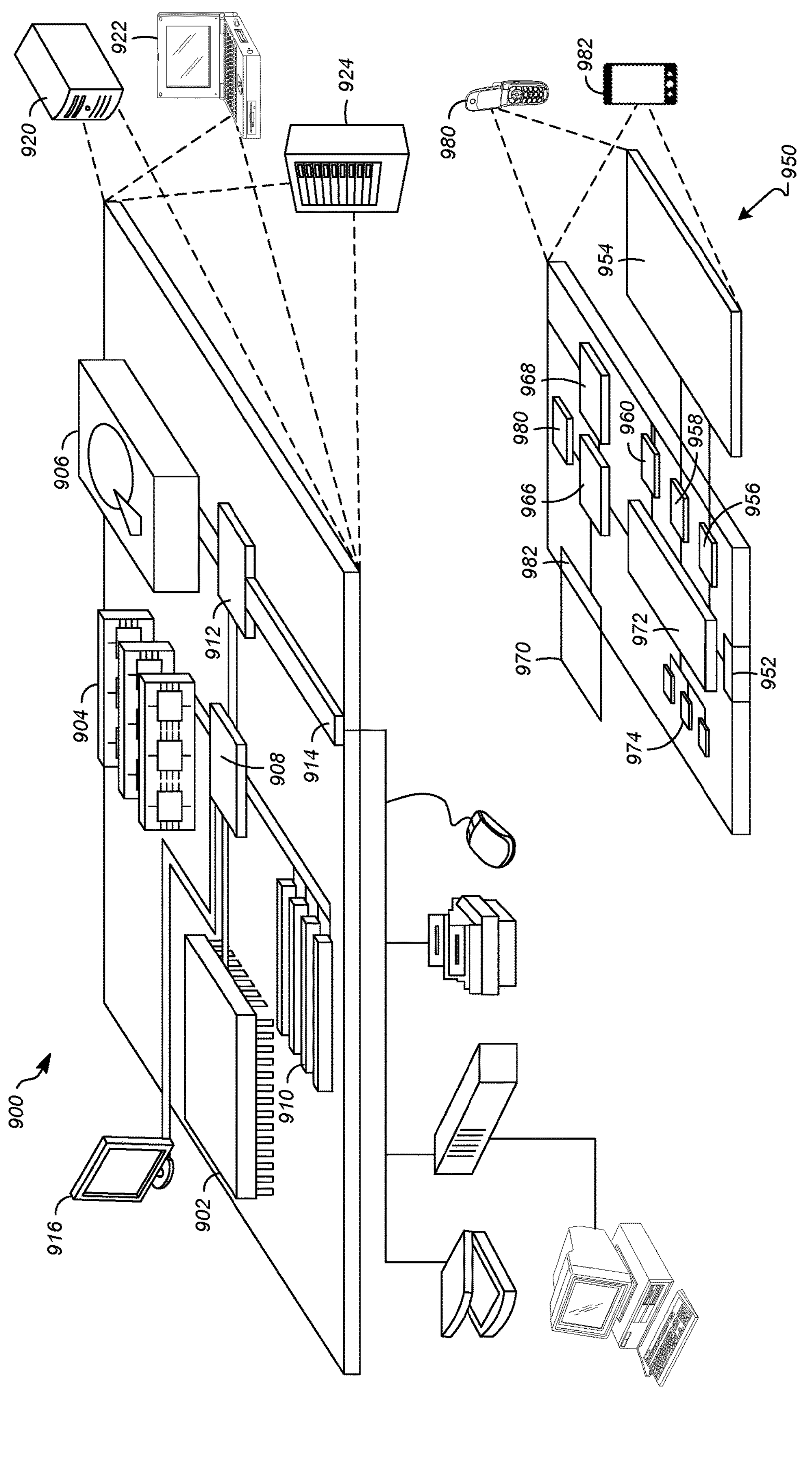
FIG. 9 is a diagram that illustrates an example of a computer device and a mobile computer device that can be used to implement the described techniques.

FIG. 9 illustrates an example of a generic computer device 900 and a generic mobile computer device 950, which may be used with the techniques described here. Computer device 900 is one example configuration of gesture detection circuitry 360 of FIG. 7.

As shown in FIG. 9, computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions are examples only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 960 may be provided in communication with processor 952, so as to enable near area communication of device 950 with other devices. External interface 960 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory 974, or memory on processor 952, that may be received, for example, over transceiver 968 or external interface 960.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Figure 10:
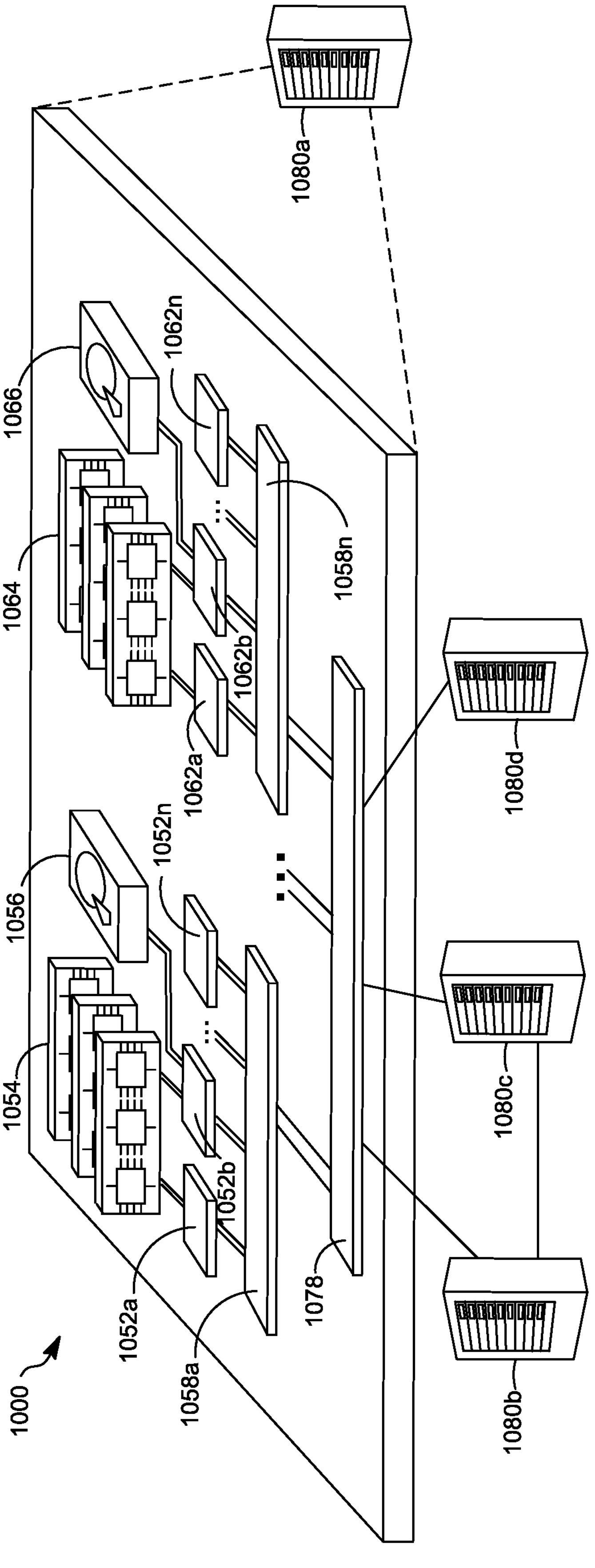
FIG. 10 is a diagram that illustrates an example of a distributed computer device that can be used to implement the described techniques.

FIG. 10 shows an example of a generic computer system 1000, which may be gesture detection circuitry 360 of FIG. 7, which may be used with the techniques described here. Computing system 1000 is intended to represent various example forms of large-scale data processing devices, such as servers, blade servers, datacenters, mainframes, and other large-scale computing devices. Computing system 1000 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Computing system 1000 may include any number of computing devices 1080*a-d*. Computing devices 1080*a-d* may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1080*a* includes multiple racks 1058*a*-1058*n*. Each rack may include one or more processors, such as processors 1052*a*-1052*n* and 1062*a*-1062*n*. The processors may include data processors, network attached storage devices, and other computer controlled devices. In some implementations, one processor may operate as a master processor and control the scheduling and data distribution tasks. Processors may be interconnected through one or more rack switches 1062*a*-1062*n*, and one or more racks may be connected through switch 1078. Switch 1078 may handle communications between multiple connected computing systems 1000.

Each rack may include memory, such as memory 1054 and memory 1064, and storage, such as 1056 and 1066. Storage 1056 and 1066 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1056 or 1066 may be shared between multiple processors, multiple racks, or multiple computing devices and may include a computer-readable medium storing instructions executable by one or more of the processors. Memory 1054 and 1064 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1054 may also be shared between processors 1052*a*-1052*n*. Data structures, such as an index, may be stored, for example, across storage 1056 and memory 1054. Computing system 1000 may include other components not shown, such as controllers, buses, input/output devices, communications modules, etc.

An entire system may be made up of multiple computing devices 1000 communicating with each other. For example, device 1080*a* may communicate with devices 1080*b*, 1080*c*, and 1080*d*, and these may collectively be known as computing device 1000. As another example, gesture detection circuitry 360 of FIG. 7 may include one or more computing devices 1000. Some of the computing devices may be located geographically close to each other, and others may be located geographically distant. The layout of system 1000 is an example only and the system may take on other layouts or configurations.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite example relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method comprising:
- receiving a sequence of images through a wrist of a user;
- applying a model that maps the sequence of images to a biological fluid flow metric;
- determining a gesture formed by the user based on the biological fluid flow metric; and
- performing an action based on the gesture.

2. The method as in claim 1, wherein the biological fluid flow metric includes a change in a perfusion index between a first frame and a second frame of the sequence of images.

3. The method as in claim 1, wherein the model is a first model, wherein determining the gesture formed by the user includes applying a second model that maps the biological fluid flow metric to the gesture.

4. The method as in claim 3, wherein the second model includes a supervised neural network, the method further comprising:
- configuring the supervised neural network using values of the biological fluid flow metric and corresponding finger movements.

5. The method as in claim 1, further comprising:
- configuring the model based on a dataset including sequences of training images and corresponding values of the biological fluid flow metric.

6. The method as in claim 5, wherein the model includes one or more hidden layers, wherein configuring the model includes generating at least one parameter of the one or more hidden layers using the sequences of training images, the corresponding values of the biological fluid flow metric, and a loss function.

7. The method as in claim 1, wherein the model includes a convolutional neural network.

8. The method as in claim 7, wherein the convolutional neural network includes a pooled layer.

9. The method as in claim 7, wherein the convolutional neural network includes a skip connection.

10. The method as in claim 7, wherein the convolutional neural network includes a regressor, the regressor including a set of keypoints of the sequences of images at which the biological fluid flow metric is evaluated.

11. A computer program product comprising a non-transitory storage medium, the computer program product including code that, when executed by processing circuitry, causes the processing circuitry to execute operations, the operations comprising:
- receiving a sequence of images through a wrist of a user;
- applying a model that maps the sequence of images to a biological fluid flow metric;
- determining a gesture formed by the user based on the biological fluid flow metric; and
- performing an action based on the gesture.

12. The computer program product as in claim 11, wherein the operations further comprise:
- forming the sequence of images by sampling electromagnetic radiation reflected from an interior of the wrist into a radiation detector at a frame rate.

13. The computer program product as in claim 12, wherein forming the sequence of images includes:
- emitting electromagnetic radiation from a radiation source into an interior of the wrist; and
- receiving the electromagnetic radiation reflected from the interior of the wrist into a radiation detector.

14. The computer program product as in claim 13, wherein the radiation source includes an infrared (IR) projector of an image capture device, the image capture device including the radiation detector.

15. The computer program product as in claim 14, wherein the radiation source includes a first radiation source and a second radiation source; and
- wherein emitting the electromagnetic radiation from the radiation source into the interior of the wrist includes:
  - emitting electromagnetic radiation from the first radiation source into a first side of the interior of the wrist and from a second radiation source into a second side of the interior of the wrist.

16. The computer program product as in claim 15, wherein the first radiation source and the second radiation source include a pair of IR light-emitting diodes (LEDs).

17. The computer program product as in claim 13, wherein the radiation detector includes a first channel detector and a second channel detector; and
- wherein receiving the electromagnetic radiation reflected from the interior of the wrist into the radiation detector includes:
  - receiving the electromagnetic radiation reflected from the interior of the wrist at the first channel detector and the second channel detector.

18. A system, comprising:
- an image capture device configured to capture a sequence of images through skin of a wrist of a user; and
- gesture detection circuitry coupled to a memory, the gesture detection circuitry being configured to:
  - apply a model that maps the sequence of images to a biological fluid flow metric;
  - determine a gesture formed by the user based on the biological fluid flow metric; and
  - perform an action based on the gesture.

19. The system as in claim 18, wherein the image capture device is disposed on a wristband worn around the wrist.

20. The system as in claim 18, wherein the image capture device includes:

a source of electromagnetic radiation, the source being configured to emit the electromagnetic radiation in an infrared (IR) wavelength band; and a detector configured to detect the electromagnetic radiation reflected from an interior of the wrist, the detector being configured to detect electromagnetic radiation in the IR wavelength band.

21. The system as in claim 20, further comprising:

an IR controller configured to control emission of the electromagnetic radiation by the source of the electromagnetic radiation according to a schedule.

22. The system as in claim 20, wherein the source of electromagnetic radiation and the detector are co-located in a single housing.

23. The system as in claim 20, wherein the detector includes a first channel detector and a second channel detector; and wherein the source of electromagnetic radiation includes a first pair of IR light-emitting diodes (LEDs) and a second pair of IR LEDs, the first pair of IR LEDs being configured to emit the electromagnetic radiation such that the electromagnetic radiation is received at the first channel detector, the second pair of IR LEDs being configured to emit the electromagnetic radiation such that the electromagnetic radiation is received at the second channel detector.

* * * * *